Patented Dec. 15, 1942

2,305,025

UNITED STATES PATENT OFFICE 2,305,025

SYNTHETIC RUBBERLIKE MATERIALS

Cornelius Mühlhausen, Leverkusen-I. G. Werk, and Wilhelm Becker, Cologne-Mulheim, Germany, assignors, by mesne assignments, to Jasco, Incorporated, a corporation of Louisiana No Drawing. Application May 23, 1939, Serial No. 275,256. In Germany May 23, 1938

7 Claims. (Cl. 260—32)

The present invention relates to improvements in the manufacture of synthetic rubber-like materials by emulsion polymerization of butadiene-1.3 hydrocarbons.

Up to the present the emulsion polymerization of butadiene-1.3 hydrocarbons has been performed mostly in an alkaline medium, at least in technical working, alkylated naphthalene sulfonic acid, soaps and similar products having been employed as emulsifying agents. When working in the manner described the polymerization proceeds relatively slowly so that an at least 100 hours' heating to a temperature of about 30° C. is required in case satisfactory yields are to be obtained. The application of higher temperatures, though exerting an accelerating effect upon the polymerization velocity, has proved to be unsuitable as the properties of the resulting synthetic rubber-like materials are considerably impaired thereby.

It is the object of the present invention to modify the emulsion polymerization of such butadienes in such a manner that the polymerization proceeds more quickly than according to the commonly employed methods. Another object of our invention resides in the development of a process which allows one to effect the emulsion polymerization of butadiene hydrocarbons at a higher temperature without involving the danger of the mechanical properties of the resulting polymerizates being impaired. Other objects will be apparent from the following description and claims.

We have found that the emulsion polymerization of butadiene-1.3 hydrocarbons (such as butadiene itself or isoprene) either alone or in admixture with other polymerizable substances such as styrene, acrylic acid nitrile, acrylic acid esters, fumaric acid esters and the like, can be considerably accelerated by using as emulsifying agents water-soluble salts of such amines, as contain straight alkyl chains of at least eight carbon atoms. Amines of the character described are preferably employed in the form of their mineral acid salts such as those of sulfuric acid or hydrochloric acid; also salts of organic acids such as acetic acid can be employed, provided that they are soluble in water. As amines of the character described there are preferably employed primary aliphatic amines containing at least 8 carbon atoms such as octyl amine, dodecyl amine, octadecyl amine, and also secondary or tertiary amines, for instance, those wherein the hydrogen atoms attached to the nitrogen of the said primary amines are wholly or partly replaced by other alkyls, for instance, octadecyldimethylamine; furthermore, there can be employed mixtures of various amines of the character described, for instance, those prepared from the higher fatty acids which are obtained by the oxidation of paraffines. We prefer to employ besides the said amine salts a substantial amount of the free amines themselves; such mixtures can be best prepared by adding to the amines such an amount of acid as is insufficient for effecting complete neutralization thereof. When working with such mixtures of amine salts and free amines care must be taken that the free amine is emulsified by the water-soluble amine salt.

As a matter of fact, our new emulsifiers can be employed in connection with the usually employed auxiliary agents. Thus, accelerators such as hydrogen peroxide and benzoyl peroxide, regulating agents (i. e. agents which prevent the product from becoming insoluble in organic solvents) such as diisobutyl xanthogendisulfide and other emulsifying agents and protective colloids can be employed. Furthermore, stabilizing agents such as phenyl-β-naphthylamine are preferably added to the emulsion at any stage prior to the storing thereof in the polymerized state; in general, an amount of about 3% of the stabilizer (calculated on the amount of the polymeric product) is sufficient to exert the desired effect.

As pointed out above, the present process allows one to work at elevated temperature without inducing the danger of the properties of the polymerizates being impaired. Thus, we can work even at a temperature of about 60° C., this temperature requiring an about 4–5 hours' heating for reaching a satisfactory yield. In many cases we prefer to work at a temperature between about 40–50°.

The following examples illustrate the present invention without, however, restricting it thereto, the parts being by weight.

Example 1

75 parts of butadiene and 25 parts of styrene are emulsified in 200 parts of water having dissolved therein 3 parts of dodecylamine hydrochloride. Upon the addition of 0.15 to 0.2 part of ammonium persulfate the mixture is kept at 30° C. After about 35 to 40 hours there are obtained about 75–80% of a mixed polymerizate of excellent properties.

If the polymerization is carried out at a temperature of 60° C. the same yield is reached after about 4-5 hours, the mechanical properties being not materially changed.

Example 2

75 parts of butadiene and 25 parts of styrene are emulsified in water with the aid of 4 parts of octadecyldimethylamine hydrochloride, 0.15 to 0.2 part of ammonium persulfate being added to the mixture as accelerator. Upon polymerizing the emulsion at 30° C. for 35-40 hours a yield of about 75-80% is reached.

Example 3

75 parts of butadiene and 25 parts of acrylic acid nitrile are subjected to polymerization under the conditions described in Example 1. After about 30 hours there is reached a yield of 80%, the resulting product being distinguished by excellent mechanical properties.

Example 4

100 parts of butadiene are emulsified in 200 parts of a 2% aqueous solution of dodecylamine hydrochloride, 0.15 part of hydrogen peroxide being added thereto as an accelerator and the whole being heated to 30° C. After 60 hours there is reached a yield of 85-90%, whereas in case of working in an alkaline medium there are required more than 160 hours for reaching the same yield.

Example 5

5 parts of a high fatty amine prepared from the mixture of higher fatty acids obtained by oxidation of paraffine are mixed with 14 parts of a 10% acetic acid and then dissolved in 200 parts of water. After the addition of 0.3 part of ammonium persulfate, 60 parts of butadiene and 40 parts of styrene are emulsified therein and the whole is kept at 30° C. while stirring for 18 hours. Upon the addition of a sodium chloride solution there are obtained 73 parts of a polymerizate of excellent plasticity.

As stabilizer there can be incorporated within the product 3 parts of phenyl-β-naphthylamine, the incorporation being best effected by adding a suspension of the stabilizer to the emulsion of the polymeric product prior to precipitation.

Example 6

5 parts of palm kernel fatty amine are mixed with an aqueous hydrochloric acid in an amount of 80% of that amount required for effecting complete neutralization thereof, and the whole is then dissolved in 180 parts of water. Upon the addition of 0.15 part of diisopropyl xanthogen disulfide and 0.3 part of ammonium persulfate 70 parts of butadiene and 30 parts of styrene are emulsified in the solution and the whole is heated to 45° while stirring for 6 hours. The resulting emulsion of the polymeric product thus obtained is stabilized as described in the preceding example and coagulation is effected by the addition of a sodium bicarbonate solution. There are obtained 80 parts of a polymeric product which is washed with dilute acids and dried at 60° C.

We claim:

1. In the manufacture of synthetic rubber-like materials by emulsion polymerization of butadiene-1.3 hydrocarbons the improvement which comprises using as emulsifying agents water-soluble acid addition salts of alkyl amines having a straight alkyl chain of at least 8 carbon atoms directly attached to the nitrogen atom.

2. In the manufacture of synthetic rubber-like materials by emulsion polymerization of butadiene-1.3 hydrocarbons the improvement which comprises using as emulsifying agents water-soluble acid addition salts of primary alkyl amines having a straight alkyl chain of at least 8 carbon atoms directly attached to the nitrogen atom.

3. In the manufacture of synthetic rubber-like materials by emulsion polymerization of butadiene-1.3 hydrocarbons the improvement which comprises using as emulsifying agent a water-soluble acid addition salt of dodecylamine.

4. In the manufacture of synthetic rubber-like materials by emulsion polymerization of butadiene-1.3 hydrocarbons the improvement which comrises using as emulsifying agent dodecylamine hydrochloride.

5. The process as claimed in claim 1 wherein the polymerization is performed at a temperature between about 40-50°.

6. The process as claimed in claim 1 wherein the butadiene-hydrocarbon is polymerized in admixture with another copolymerizable compound.

7. The process as claimed in claim 1 wherein the butadiene-hydrocarbon is polymerized in admixture with styrene.

CORNELIUS MÜHLHAUSEN.
WILHELM BECKER.